United States Patent
Suzuki et al.

(10) Patent No.: US 12,166,207 B2
(45) Date of Patent: Dec. 10, 2024

(54) POSITIVE ELECTRODE ACTIVE MATERIAL FOR NONAQUEOUS ELECTROLYTE SECONDARY BATTERIES, AND NONAQUEOUS ELECTROLYTE SECONDARY BATTERY

(71) Applicant: Panasonic Corporation, Kadoma (JP)

(72) Inventors: Shinya Suzuki, Hyogo (JP); Takashi Ko, Osaka (JP); Fumiharu Niina, Hyogo (JP); Sho Tsuruta, Osaka (JP); Katsunori Yanagida, Hyogo (JP); Natsumi Goto, Hyogo (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 507 days.

(21) Appl. No.: 17/630,362

(22) PCT Filed: Jul. 21, 2020

(86) PCT No.: PCT/JP2020/028207
§ 371 (c)(1),
(2) Date: Jan. 26, 2022

(87) PCT Pub. No.: WO2021/024789
PCT Pub. Date: Feb. 11, 2021

(65) Prior Publication Data
US 2022/0271284 A1 Aug. 25, 2022

(30) Foreign Application Priority Data
Aug. 5, 2019 (JP) .................................. 2019-143871

(51) Int. Cl.
*H01M 4/525* (2010.01)
*C01G 53/00* (2006.01)
(Continued)

(52) U.S. Cl.
CPC ............ *H01M 4/525* (2013.01); *C01G 53/50* (2013.01); *H01M 4/366* (2013.01); *H01M 4/505* (2013.01);
(Continued)

(58) Field of Classification Search
CPC .......... H01M 2004/028; H01M 4/364; H01M 4/366; H01M 4/485; H01M 4/505; H01M 4/525
See application file for complete search history.

(56) References Cited

U.S. PATENT DOCUMENTS

2004/0201948 A1  10/2004  Hosoya et al.
2009/0305136 A1  12/2009  Yada et al.
(Continued)

FOREIGN PATENT DOCUMENTS

JP  2004-253305 A  9/2004
JP  2004-319105 A  11/2004
(Continued)

OTHER PUBLICATIONS

International Search Report dated Oct. 20, 2020, issued in counterpart International Application No. PCT/JP2020/028207. (2 pages).
(Continued)

*Primary Examiner* — Kevin E Yoon
(74) *Attorney, Agent, or Firm* — WHDA, LLP

(57) ABSTRACT

A positive electrode active material for nonaqueous electrolyte secondary batteries contains a lithium transition metal composite oxide that contains not less than 80% by mole of Ni relative to the total number of moles of metal elements other than Li; and Ti is present at least in the surfaces of particles of the composite oxide. With respect to this positive electrode active material, if particles having a volume-based particle diameter more than the 70% particle diameter (D70) are taken as first particles and particles having a volume-
(Continued)

based particle diameter less than the 30% particle diameter (D30) are taken as second particles, the molar fraction (A2) of Ti relative to the total number of moles of metal elements in the surfaces of the second particles is higher than the molar fraction (A1) of Ti relative to the total number of moles of metal elements in the surfaces of the first particles.

5 Claims, 1 Drawing Sheet

(51) Int. Cl.
    *H01M 4/36*     (2006.01)
    *H01M 4/505*     (2010.01)
    *H01M 10/0525*     (2010.01)
    *H01M 4/02*     (2006.01)

(52) U.S. Cl.
    CPC ..... *H01M 10/0525* (2013.01); *C01P 2002/52* (2013.01); *C01P 2004/84* (2013.01); *C01P 2006/40* (2013.01); *H01M 2004/021* (2013.01); *H01M 2004/028* (2013.01)

(56) References Cited

U.S. PATENT DOCUMENTS

2022/0166007 A1    5/2022   Ko et al.
2022/0177326 A1*   6/2022   Koshika ............ H01M 10/0525

FOREIGN PATENT DOCUMENTS

| | | |
|---|---|---|
| JP | 2007-265668 A | 10/2007 |
| JP | 2009-224307 A | 10/2009 |
| JP | 2012-113823 A | 6/2012 |
| KR | 1020190058367 A * | 5/2019 .......... H01M 10/052 |
| WO | 2020/202745 A1 | 10/2020 |

OTHER PUBLICATIONS

The Extended European Search Report dated Aug. 4, 2022, issued in counterpart EP Application No. 20851077.6. (8 pages).

* cited by examiner

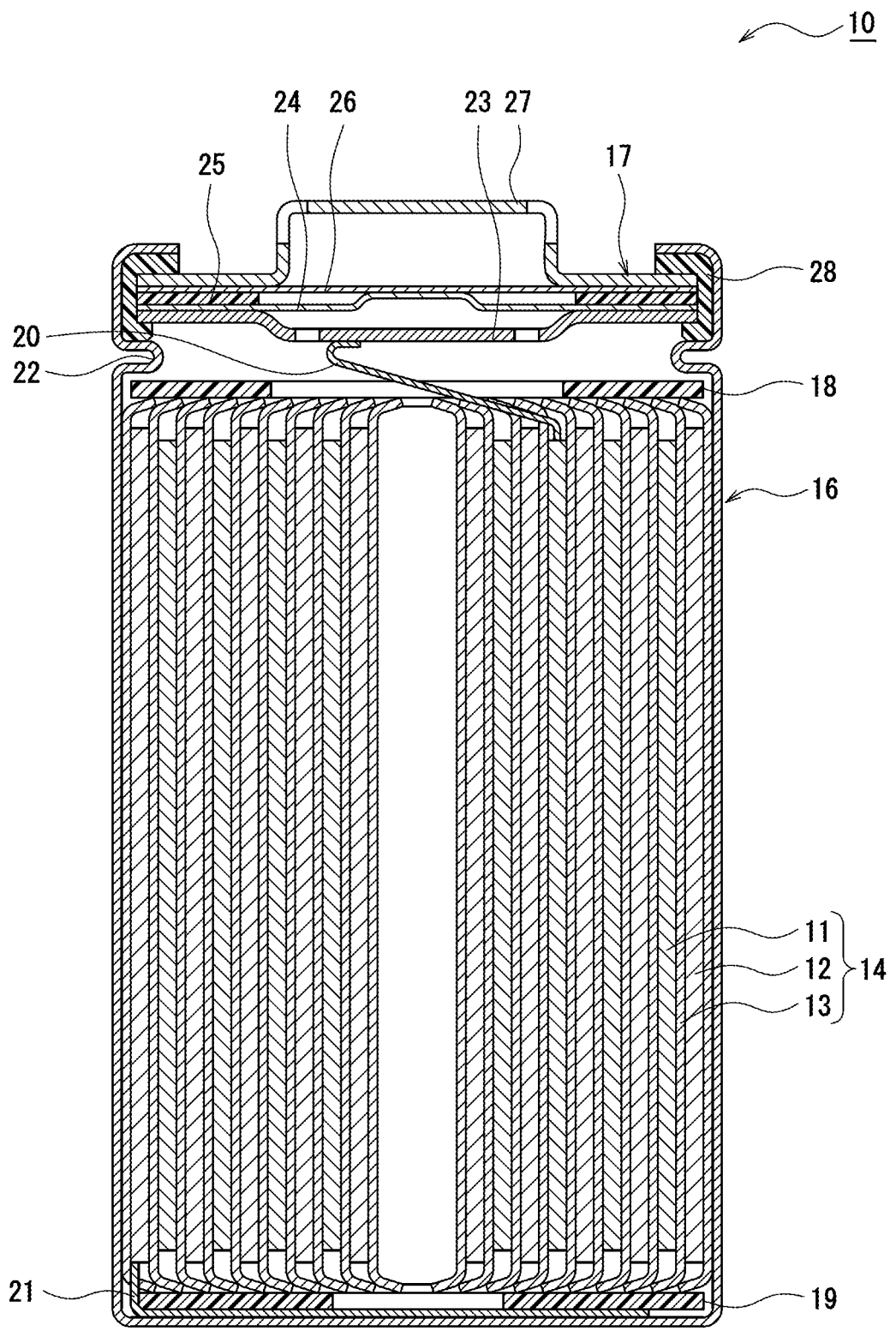

POSITIVE ELECTRODE ACTIVE MATERIAL FOR NONAQUEOUS ELECTROLYTE SECONDARY BATTERIES, AND NONAQUEOUS ELECTROLYTE SECONDARY BATTERY

CROSS-REFERENCE TO RELATED APPLICATIONS

This application is a national stage of International Application No. PCT/JP2020/028207, filed Jul. 21, 2020, which claims priority to Japanese Patent Application No. 2019-143871 filed Aug. 5, 2019 which are hereby incorporated by reference in their entirety.

TECHNICAL FIELD

The present disclosure generally relates to a positive electrode active material for a non-aqueous electrolyte secondary battery and to a non-aqueous electrolyte secondary battery using the positive electrode active material.

BACKGROUND ART

In recent years, a lithium-transition metal composite oxide with a high Ni content has attracted attention as a positive electrode active material with a high energy density. Patent Literature 1, for example, discloses a surface-modified lithium-nickel composite oxide obtained by: providing a compound of an element of which oxide has a melting point of 750° C. or higher (such as titanium oxide) among elements of 4B to 6B groups in the periodic table on a particle surface of a composite oxide with a high Ni content; and then calcinating the composite oxide. Patent Literature 1 describes that a storage stability at high temperature, particularly an impedance variation, of the battery may be significantly improved.

CITATION LIST

Patent Literature

PATENT LITERATURE 1: Japanese Unexamined Patent Application Publication No. 2004-253305

SUMMARY

In non-aqueous electrolyte secondary batteries such as lithium ion batteries, inhibiting an increase in resistance and lowering in capacity associated with charging and discharging is an important challenge. The art disclosed in Patent Literature 1 has still a room for improvement in achievement of both inhibiting the increase in resistance and inhibiting the lowering in capacity.

An object of the present disclosure is to inhibit the increase in resistance and lowering in capacity associated with charging and discharging in a non-aqueous electrolyte secondary battery including a positive electrode active material with a high energy density.

A positive electrode active material for a non-aqueous electrolyte secondary battery of an aspect of the present disclosure includes a lithium-transition metal composite oxide containing 80 mol % or more of Ni based on a total number of moles of metal elements excluding Li, and Ti is present on at least a particle surface of the composite oxide. In the positive electrode active material, when particles having a particle diameter on a volumetric basis larger than a 70% particle diameter (D70) are defined as first particles, and particles having a particle diameter on a volumetric basis smaller than a 30% particle diameter (D30) are defined as second particles, a mole fraction of Ti based on a total number of moles of metal elements excluding Li on surfaces of the second particles (A2) is larger than a mole fraction of Ti based on a total number of moles of metal elements excluding Li on surfaces of the first particles (A1).

A non-aqueous electrolyte secondary battery of an aspect of the present disclosure comprises: a positive electrode including the positive electrode active material; a negative electrode; and a non-aqueous electrolyte.

The positive electrode active material of an aspect of the present disclosure may provide a non-aqueous electrolyte secondary battery in which the increase in resistance and lowering in capacity associated with charging and discharging are inhibited.

BRIEF DESCRIPTION OF DRAWING

FIG. 1 is a sectional view of a non-aqueous electrolyte secondary battery of an example of an embodiment.

DESCRIPTION OF EMBODIMENTS

The present inventors have made intensive investigation to solve the above problem, and as a result, have found that setting a mole fraction of Ti on surfaces of the second particles having a smaller particle diameter to be larger than a mole fraction of Ti on surfaces of the first particles having a larger particle diameter specifically inhibits the increase in resistance and lowering in capacity associated with charging and discharging. From smaller particles such as the second particles, a metal constituting a composite oxide are more likely to be eluted during charge and discharge than from larger particles such as the first particles. The metal elution is presumed to be a cause of the increase in resistance and the lowering in capacity associated with charging and discharging. It is considered that the larger amount of Ti present on the surfaces of the smaller particles may inhibit the metal elution to result in the above effect. Ti is present mainly in a state of lithium titanate on the particle surface of the lithium-transition metal composite oxide.

Hereinafter, an example of an embodiment of a positive electrode active material for the non-aqueous electrolyte secondary battery according to the present disclosure and the non-aqueous electrolyte secondary battery using the positive electrode active material will be described in detail. Hereinafter, a cylindrical battery in which a wound electrode assembly 14 is housed in a bottomed cylindrical exterior housing can 16 will be exemplified, but an exterior housing body is not limited to a cylindrical exterior housing can and may be, for example, a rectangular exterior housing can and may be an exterior housing body constituted of laminated sheets including a metal layer and a resin layer. The electrode assembly may be a stacked electrode assembly in which a plurality of positive electrodes and a plurality of negative electrodes are alternatively stacked with separators interposed therebetween.

FIG. 1 is a sectional view of a non-aqueous electrolyte secondary battery 10 of an example of an embodiment. As exemplified in FIG. 1, the non-aqueous electrolyte secondary battery 10 comprises the wound electrode assembly 14, a non-aqueous electrolyte, and the exterior housing can 16 housing the electrode assembly 14 and the non-aqueous electrolyte. The electrode assembly 14 has a positive electrode 11, a negative electrode 12, and a separator 13, and has a wound structure in which the positive electrode 11 and the negative electrode 12 are spirally wound with the separator 13 interposed therebetween. The exterior housing can 16 is a bottomed cylindrical metallic container having an opening at one side in an axial direction, and the opening of the exterior housing can 16 is sealed with a sealing assembly 17. Hereinafter, for convenience of description, the sealing assembly 17 side of the battery will be described as the upper side, and the bottom side of the exterior housing can 16 will be described as the lower side.

The non-aqueous electrolyte includes a non-aqueous solvent and an electrolyte salt dissolved in the non-aqueous solvent. For the non-aqueous solvent, esters, ethers, nitriles, amides, a mixed solvent of two or more thereof, and the like are used, for example. The non-aqueous solvent may contain a halogen-substituted solvent in which at least some hydrogens in these solvents are substituted with halogen atoms such as fluorine. For the electrolyte salt, a lithium salt such as $LiPF_6$ is used, for example. The electrolyte is not limited to a liquid electrolyte, and may be a solid electrolyte using a gel polymer or the like.

Any of the positive electrode 11, negative electrode 12, and separator 13 constituting the electrode assembly 14 is a band-shaped elongated body, and spirally wound to be alternatively stacked in a radial direction of the electrode assembly 14. To prevent precipitation of lithium, the negative electrode 12 is formed to be one size larger than the positive electrode 11. That is, the negative electrode 12 is formed to be longer than the positive electrode 11 in a longitudinal direction and a width direction (short direction). Two separators 13 are formed to be one size larger than at least the positive electrode 11, and disposed to, for example, sandwich the positive electrode 11. The electrode assembly 14 has a positive electrode lead 20 connected to the positive electrode 11 by welding or the like and a negative electrode lead 21 connected to the negative electrode 12 by welding or the like.

Insulating plates 18 and 19 are disposed on the upper and lower sides of the electrode assembly 14, respectively. In the example illustrated in FIG. 1, the positive electrode lead 20 extends through a through hole in the insulating plate 18 toward a side of the sealing assembly 17, and the negative electrode lead 21 extends through an outside of the insulating plate 19 toward the bottom side of the exterior housing can 16. The positive electrode lead 20 is connected to a lower surface of an internal terminal plate 23 of the sealing assembly 17 by welding or the like, and a cap 27, which is a top plate of the sealing assembly 17 electrically connected to the internal terminal plate 23, becomes a positive electrode terminal. The negative electrode lead 21 is connected to a bottom inner surface of the exterior housing can 16 by welding or the like, and the exterior housing can 16 becomes a negative electrode terminal.

A gasket 28 is provided between the exterior housing can 16 and the sealing assembly 17 to achieve sealability inside the battery. On the exterior housing can 16, a grooved part 22 in which a part of a side part thereof projects inside for supporting the sealing assembly 17 is formed. The grooved part 22 is preferably formed in a circular shape along a circumferential direction of the exterior housing can 16, and supports the sealing assembly 17 with the upper surface thereof. The sealing assembly 17 is fixed on the upper part of the exterior housing can 16 with the grooved part 22 and with an end part of the opening of the exterior housing can 16 calked to the sealing assembly 17.

The sealing assembly 17 has a stacked structure of the internal terminal plate 23, a lower vent member 24, an insulating member 25, an upper vent member 26, and the cap 27 in this order from the electrode assembly 14 side. Each member constituting the sealing assembly 17 has, for example, a disk shape or a ring shape, and each member except for the insulating member 25 is electrically connected each other. The lower vent member 24 and the upper vent member 26 are connected at each of central parts thereof, and the insulating member 25 is interposed between each of the circumferential parts of the vent members 24 and 26. If the internal pressure of the battery increases due to abnormal heat generation, the lower vent member 24 is deformed so as to push the upper vent member 26 up toward the cap 27 side and breaks, and thereby a current pathway between the lower vent member 24 and the upper vent member 26 is cut off. If the internal pressure further increases, the upper vent member 26 breaks, and gas is discharged through the cap 27 opening.

Hereinafter, the positive electrode 11, negative electrode 12, and separator 13, which constitute the electrode assembly 14, particularly the positive electrode active material constituting the positive electrode 11, will be described in detail.

[Positive Electrode]

The positive electrode 11 has a positive electrode core body and a positive electrode mixture layer provided on a surface of the positive electrode core body. For the positive electrode core body, a foil of a metal stable within a potential range of the positive electrode 11, such as aluminum, a film in which such a metal is disposed on a surface layer thereof, and the like may be used. The positive electrode mixture layer includes a positive electrode active material, a binder, and a conductive agent, and is preferably provided on both surfaces of the positive electrode core body except for a portion to which the positive electrode lead 20 is connected. The positive electrode 11 may be produced by, for example, applying a positive electrode mixture slurry including the positive electrode active material, the binder, the conductive agent, and the like on the surface of the positive electrode core body, drying and subsequently compressing the applied film to form the positive electrode mixture layers on both the surfaces of the positive electrode core body.

Examples of the conductive agent included in the positive electrode mixture layer may include a carbon material such as carbon black, acetylene black, Ketjenblack, and graphite. Examples of the binder included in the positive electrode mixture layer may include a fluororesin such as polytetrafluoroethylene (PTFE) and polyvinylidene fluoride (PVdF), polyacrylonitrile (PAN), a polyimide, an acrylic resin, and a polyolefin. With these resins, a cellulose derivative such as carboxymethyl cellulose (CMC) or a salt thereof, polyethylene oxide (PEO), and the like may be used in combination.

The positive electrode active material includes particles of a lithium-transition metal composite oxide containing 80 mol % or more of Ni based on the total number of moles of metal elements excluding Li. A Ni content of 80 mol % or more may yield a battery having a high energy density. In the lithium-transition metal composite oxide, Ti is present on at least the particle surface. Hereinafter, for convenience of description, the lithium-transition metal composite oxide is referred to as "composite oxide (Z)". The positive electrode active material is mainly composed of the composite oxide (Z), and may be composed of substantially only the composite oxide (Z). The positive electrode active material may include a composite oxide other than the composite oxide (Z) or another compound within a range in that an object of the present disclosure is not impaired.

The composite oxide (Z) may contain a metal element other than Li, Ni, and Ti. Example of the metal element may include Co, Mn, Al, Zr, B, Mg, Fe, Cu, Zn, Sn, Na, K, Ba, Sr, Ca, W, Mo, Nb, and Si. A preferable example of the composite oxide (Z) is a composite oxide represented by the general formula $Li_aNi_bCo_cMn_dTi_eO_f$ (in the formula, $0.8 \leq a \leq 1.2$, $b \geq 0.82$, $c \leq 0.12$, $0.03 \leq d \leq 0.12$, $0.01 \leq e \leq 0.05$, and $1 \leq f \leq 2$). That is, a mole fraction of Ti based on the total number of moles of metal elements excluding Li (a rate of a number of moles of Ti) is preferably 0.01 to 0.05.

The composite oxide (Z) is, for example, a secondary particle formed by aggregation of primary particles. The particle diameter of the primary particles constituting the secondary particle is, for example, 0.05 μm to 1 μm. The particle diameter of the primary particles is measured as a diameter of a circumscribed circle in a particle image observed with a scanning electron microscope (SEM). Ti is present on the surface of the secondary particle of the composite oxide (Z), and also present on surfaces of the primary particles. A part of Ti may also be present inside the primary particles to form a solid solution with another metal element contained in the composite oxide (Z).

The composite oxide (Z) is particles having a median diameter (D50) on a volumetric basis of, for example, 3 μm to 30 μm, preferably 5 μm to 25 μm, and particularly preferably 7 μm to 15 μm. The D50, also referred to as a median diameter, means a particle diameter at which a cumulative frequency is 50% from a smaller particle diameter side in a particle size distribution on a volumetric basis. The particle size distribution of the composite oxide (Z) may be measured by using a laser diffraction-type particle size distribution measuring device (for example, MT3000II, manufactured by MicrotracBEL Corp.) with water as a dispersion medium.

In the composite oxide (Z), when particles having a particle diameter on a volumetric basis larger than a 70% particle diameter (D70) are defined as first particles, and particles having a particle diameter on a volumetric basis smaller than a 30% particle diameter (D30) are defined as second particles, a mole fraction of Ti on surfaces of the second particles is larger than a mole fraction of Ti on surfaces of the first particles. The second particles may contain particles having a mole fraction of Ti on particle surfaces thereof being equal to or smaller than the mole fraction of Ti on the surfaces of the first particles.

The D70 means a particle diameter at which a cumulative frequency is 70% from a smaller particle diameter side in a particle size distribution on a volumetric basis. Similarly, the D30 means a particle diameter at which the cumulative frequency is 30% from the smaller particle diameter side in the particle size distribution on a volumetric basis. For example, the D70 is 9 μm to 19 μm, and the D30 is 3 μm to 13 μm. The mole fraction of the metal elements present on the particle surface of the composite oxide (Z) is measured by X-ray photoelectron spectroscopic analysis (XPS). The mole fraction of the metal elements in an entirety of the particles of the composite oxide (Z) is measured by inductively coupled plasma (ICP) atomic emission spectroscopic analysis.

In the composite oxide (Z), a mole fraction of Ti based on the total number of moles of the metal elements on the surfaces of the second particles (A2) is larger than a mole fraction of Ti based on the total number of moles of the metal elements on the surfaces of the first particles (A1). Regulating Ti amounts on particle surfaces to be A1<A2 may inhibit the increase in resistance and lowering in capacity associated with charging and discharging. The mole fraction (A1) is determined by, for example, XPS on the first particle. A spot diameter of the X-ray irradiation is preferably 0.03 mmφ or larger, more preferably 0.1 mmφ or larger, and particularly preferably 1 mmφ or larger, and several or hundreds of the first particles are preferably included in the spot (the mole fraction (A2) is the same as above). A measuring object of the XPS is typically elements present between 2 nm to 8 nm from the outermost surfaces of the particles.

The Ti is present mainly in a state of lithium titanate represented by $Li_xTi_yO_z$ on the particle surface of the composite oxide (Z). In the formula, x, y, and z satisfy, for example, $1 \leq x \leq 4$, $1 \leq y \leq 5$, and $1 \leq z \leq 12$. As described later, Ti compounds such as titanium oxide ($TiO_2$) are used as a Ti source, and to be reacted with Li present on the particle surface during calcination to generate $Li_xTi_yO_z$.

The lithium titanate may be formed for coating an entirety of the surface of the secondary particle, or may be scatteringly present on the particle surfaces. When the lithium titanate is particles, a particle diameter thereof is typically smaller than the particle diameter of the primary particles constituting the composite oxide (Z). The lithium titanate particles may be observed with an SEM. The lithium titanate is preferably adhered in a wide range without uneven distribution on a part of the surfaces of the primary particles constituting the composite oxide (Z).

A ratio (A2/A1) of the mole fraction of Ti on the surfaces of the second particles (A2) to the mole fraction of Ti on the surfaces of the first particles (A1) is preferably 1.10 or more, more preferably 1.15 or more, and particularly preferably 1.20 or more. In particular, the increase in resistance and lowering in capacity associated with charging and discharging may be more highly inhibited in the case of A2/A1≥1.20. An upper limit of A2/A1 is not particularly limited.

In the composite oxide (Z), Ti may be present inside the primary particles to form a solid solution with a transition metal element such as Ni, as described above. A mole fraction of Ti based on the metal element forming the solid solution may be determined on a cross section of the primary particles by energy dispersive X-ray spectroscopy (EDS). In the composite oxide (Z), a total number of moles of Ti in lithium titanate present in a state of the solid solution and on the surface is preferably 0.01 to 0.05 based on a total number of moles of metal elements excluding Li.

In the composite oxide (Z), the second particles preferably have a larger ratio than the first particles, of the mole fraction of Ti present on the particle surface to a mole fraction of Ti in an entirety of the particles (mole fraction of Ti on the particle surface/mole fraction of Ti in an entirety of the particles). That is, the second particles contain more particles having a higher ratio mentioned above than that of the primary particles. In this case, the increase in resistance and lowering in capacity associated with charging and discharging may be more highly inhibited.

The composite oxide (Z) may be produced by, for example, the following procedure.

(1) Into each of two composite compounds having different D50s and containing no Li nor Ti, Li sources such as lithium hydroxide are added, and the mixtures are calcinated to synthesize lithium composite oxides (Z1) and (Z2) having different D50s. An example of the composite compounds is a composite oxide or hydroxide containing Ni, Co, and Mn. At this time, one lithium composite oxide may be classified to obtain lithium composite oxides having two average particle diameters. For the classification, conventionally known methods may be used.

(2) Ti sources are added into each of the composite oxides (Z1) and (Z2) to form composites of Ti on the particle surfaces, then the composite oxides are calcinated, and thereafter the composite oxides (Z1) and (Z2) are mixed. An example of the Ti sources is titanium oxide ($TiO_2$). For forming composites, a dry particle composing machine (for example, NOB-130, manufactured by HOSOKAWA MICRON CORPORATION) or the like is used. At this time, the Li source such as lithium hydroxide may be added in addition to the Ti source.

A calcinating temperature in the step (2) is, for example, 550° C. to 750° C. A lower temperature tends to generate a larger amount of lithium titanate on the surfaces of the primary particles, and tends to decrease the amount of the Ti solid solution. Setting the amount of Ti to be added to the smaller particles to be larger than the amount of Ti to be added to the larger particles may achieve the state of A1<A2. In addition, setting a calcination temperature for the smaller particles to be lower than a calcination temperature for the larger particles may also achieve the state of A1<A2.

[Negative Electrode]

The negative electrode 12 has a negative electrode core body and a negative electrode mixture layer provided on a surface of the negative electrode core body. For the negative electrode core body, a foil of a metal stable within a potential range of the negative electrode 12, such as copper, a film in which such a metal is disposed on a surface layer thereof, and the like may be used. The negative electrode mixture layer includes a negative electrode active material and a binder, and is preferably provided on, for example, both surfaces of the negative electrode core body except for a portion to which the negative electrode lead 21 is connected. The negative electrode 12 may be produced by, for example, applying a negative electrode mixture slurry including the negative electrode active material, the binder, and the like on the surface of the negative electrode core body, drying and subsequently compressing the applied film to form the negative electrode mixture layers on both the surfaces of the negative electrode core body.

The negative electrode mixture layer includes, for example, a carbon-based active material to reversibly occlude and release lithium ions, as the negative electrode active material. The carbon-based active material is preferably a graphite such as: a natural graphite such as flake graphite, massive graphite, and amorphous graphite; and an artificial graphite such as massive artificial graphite (MAG) and graphitized mesophase-carbon microbead (MCMB). For the negative electrode active material, a Si-based active material composed of at least one of Si and a Si-containing compound may also be used, and the carbon-based active material and the Si-based active material may be used in combination.

For the binder included in the negative electrode mixture layer, a fluororesin, PAN, a polyimide, an acrylic resin, a polyolefin, and the like may be used similar to that in the positive electrode 11, but styrene-butadiene rubber (SBR) is preferably used. The negative electrode mixture layer preferably further includes CMC or a salt thereof, polyacrylic acid (PAA) or a salt thereof, polyvinyl alcohol (PVA), and the like. Among them, SBR; and CMC or a salt thereof, or PAA or a salt thereof are preferably used in combination.

[Separator]

For the separator 13, a porous sheet having an ion permeation property and an insulation property is used. Specific examples of the porous sheet include a fine porous thin film, a woven fabric, and a nonwoven fabric. As a material for the separator 13, a polyolefin such as polyethylene and polypropylene, cellulose, and the like are preferable. The separator 13 may have any of a single-layered structure and a multilayered structure. On a surface of the separator, a heat-resistant layer and the like may be formed.

EXAMPLES

Hereinafter, the present disclosure will be further described with Examples, but the present disclosure is not limited to these Examples.

Example 1

[Synthesis of Positive Electrode Active Material]

A nickel-cobalt-manganese composite hydroxide having D50 of 14 μm with a composition of $Ni_{0.87}Co_{0.10}Mn_{0.06}(OH)_2$ and a nickel-cobalt-manganese composite hydroxide having D50 of 10 μm with a composition of $Ni_{0.84}Co_{0.10}Mn_{0.06}(OH)_2$, obtained by coprecipitation, were separately calcinated at 500° C. to obtain a nickel-cobalt-manganese composite oxide having a larger average particle diameter (X1) and a nickel-cobalt-manganese composite oxide having a smaller average particle diameter (Y1).

Then, a lithium hydroxide and the nickel-cobalt-manganese composite oxide having a larger average particle diameter (X1) were mixed so that a molar ratio between Li and the total amount of Ni, Co, and Mn was 1.08:1. This mixture was calcinated in an oxygen atmosphere at 700° C. for 8 hours, and then crushed to obtain a lithium composite oxide having a larger average particle diameter (X2).

Thereafter, a lithium hydroxide and the nickel-cobalt-manganese composite oxide having a smaller average particle diameter (Y1) were mixed so that a molar ratio between Li and the total amount of Ni, Co, and Mn was 1.08:1. This mixture was calcinated in an oxygen atmosphere at 700° C. for 8 hours, and then crushed to obtain a lithium composite oxide having a smaller average particle diameter (Y2).

Next, the lithium composite oxide having a larger average particle diameter (X2) and a titanium oxide ($TiO_2$) were dry-mixed so that a molar ratio between the total amount of Ni, Co, and Mn, and Ti in $TiO_2$ was 1:0.02 to form a composite of Ti on the particle surface. This mixture was calcinated in an oxygen atmosphere at 700° C. for 8 hours, and then crushed to obtain a lithium composite oxide in which Ti was present on the particle surface (X3).

Then, the lithium composite oxide having a smaller average particle diameter (Y2) and $TiO_2$ were dry-mixed so that a molar ratio between the total amount of Ni, Co, and Mn, and Ti in $TiO_2$ was 1:0.025 to form a composite of Ti on the particle surface. This mixture was calcinated in an oxygen atmosphere at 700° C. for 8 hours, and then crushed to obtain a lithium composite oxide in which Ti was present on the particle surface (Y3).

Thereafter, the lithium composite oxides (X3) and (Y3) were mixed at a mass ratio of 1:1 to be a positive electrode active material. Ti present on the particle surface may be quantified by XPS, and Ti in a solid solution may be quantified by EDS. The presence of Ti in a state of lithium titanium oxide on the particle surface may be confirmed by XRD, XPS, XAFS, and the like.

The ratio (A2/A1) of the mole fraction of Ti on the surfaces of the second particles having a particle diameter on a volumetric basis smaller than D30 (A2) to the mole fraction of Ti on the surfaces of the first particles having a particle diameter on a volumetric basis larger than D70 (A1) was 1.17. The mole fraction of Ti of each of the first and second particles was determined by XPS.

ICP analysis demonstrated that the positive electrode active material has a composition of $Li_{1.01}Ni_{0.81}Co_{0.10}Mn_{0.06}Ti_{0.02}O_2$. In a particle size distribution of the positive electrode active material, the D50 was 12 µm, the D70 was 14 µm, and the D30 was 10 µm.

[Production of Positive Electrode]

The above positive electrode active material, acetylene black, and polyvinylidene fluoride (PVdF) were mixed at a solid-content mass ratio of 96.3:2.5:1.2, an appropriate amount of N-methyl-2-pyrrolidone (NMP) was added, and then the mixture was kneaded to prepare a positive electrode mixture slurry. This positive electrode mixture slurry was applied on both surfaces of a positive electrode core body made of aluminum foil, the applied film was dried, and then rolled using a roller and cut to a predetermined electrode size to obtain a positive electrode in which the positive electrode mixture layer was formed on both the surfaces of the positive electrode core body. An exposed part where a surface of the positive electrode core body was exposed was provided at a part of the positive electrode.

[Production of Negative Electrode]

Natural graphite was used as the negative electrode active material. The negative electrode active material, carboxymethyl cellulose sodium salt (CMC-Na), and styrene-butadiene rubber (SBR) were mixed at a solid-content mass ratio of 100:1:1 in an aqueous solution to prepare a negative electrode mixture slurry. This negative electrode mixture slurry was applied on both surfaces of a negative electrode core body made of copper foil, the applied film was dried, and then rolled using a roller and cut to a predetermined electrode size to obtain a negative electrode in which the negative electrode mixture layer was formed on both the surfaces of the negative electrode core body. An exposed part where a surface of the negative electrode core body was exposed was provided at a part of the negative electrode.

[Preparation of Non-Aqueous Electrolyte]

Into a mixed solvent of ethylene carbonate (EC), ethyl methyl carbonate (EMC), and dimethyl carbonate (DMC) at a volume ratio of 3:3:4, lithium hexafluorophosphate ($LiPF_6$) was dissolved at a concentration of 1.0 mol/litter. Vinylene carbonate (VC) was further dissolved into the above mixed solvent at a concentration of 2.0 mass % to prepare a non-aqueous electrolyte liquid.

[Production of Battery]

An aluminum lead was attached to the exposed part of the positive electrode, a nickel lead was attached to the exposed part of the negative electrode, the positive electrode and the negative electrode were spirally wound with a separator made of polyolefin interposed therebetween, and then press-formed in the radial direction to produce a flat, wound electrode assembly. This electrode assembly was housed in an exterior housing body composed of an aluminum laminated sheet, the above non-aqueous electrolyte liquid was injected thereinto, and then an opening of the exterior housing body was sealed to obtain a non-aqueous electrolyte secondary battery having a designed capacity of 650 mAh.

Example 2

A non-aqueous electrolyte secondary battery was produced in the same manner as in Example 1 except that the lithium composite oxide having a smaller average particle diameter (Y2) and $TiO_2$ were mixed so that a molar ratio between the total amount of Ni, Co, and Mn, and Ti in $TiO_2$ was 1:0.03 in the synthesis of the positive electrode active material.

Example 3

A non-aqueous electrolyte secondary battery was produced in the same manner as in Example 1 except that the calcinating condition for the lithium composite oxide having a smaller average particle diameter in which a composite of Ti was formed on the particle surface (Y3) was changed to 600° C. for 8 hours.

Example 4

A non-aqueous electrolyte secondary battery was produced in the same manner as in Example 1 except that the lithium hydroxide, the nickel-cobalt-manganese composite oxide having a larger average particle diameter (X1), and titanium oxide ($TiO_2$) were mixed so that a molar ratio between Li, the total amount of Ni, Co, and Mn, and Ti in $TiO_2$ was 1.08:1:0.01 in the synthesis of the positive electrode active material.

Example 5

A non-aqueous electrolyte secondary battery was produced in the same manner as in Example 1 except that the lithium hydroxide, the nickel-cobalt-manganese composite oxide having a smaller average particle diameter (Y1), and titanium oxide ($TiO_2$) were mixed so that a molar ratio between Li, the total amount of Ni, Co, and Mn, and Ti in $TiO_2$ was 1.08:1:0.01 in the synthesis of the positive electrode active material.

Example 6

A non-aqueous electrolyte secondary battery was produced in the same manner as in Example 1 except that: the lithium hydroxide, the nickel-cobalt-manganese composite oxide having a larger average particle diameter (X1), and titanium oxide ($TiO_2$) were mixed so that a molar ratio between Li, the total amount of Ni, Co, and Mn, and Ti in $TiO_2$ was 1.08:1:0.01; and the lithium hydroxide, the nickel-cobalt-manganese composite oxide having a smaller average particle diameter (Y1), and titanium oxide ($TiO_2$) were mixed so that a molar ratio between Li, the total amount of Ni, Co, and Mn, and Ti in $TiO_2$ was 1.08:1:0.01, in the synthesis of the positive electrode active material.

Comparative Example 1

A non-aqueous electrolyte secondary battery was produced in the same manner as in Example 1 except that mixing of $TiO_2$ and subsequent calcination were not performed in the synthesis of the positive electrode active material.

Comparative Example 2

A non-aqueous electrolyte secondary battery was produced in the same manner as in Example 1 except that a mixture of the lithium composite oxide having a larger average particle diameter (X2) and the lithium composite oxide having a smaller average particle diameter (Y2) at a mass ratio of 1:1 and $TiO_2$ were dry-mixed so that a molar ratio between the total amount of Ni, Co, and Mn, and Ti in $TiO_2$ was 1:0.02 in the synthesis of the positive electrode active material.

Comparative Example 3

A non-aqueous electrolyte secondary battery was produced in the same manner as in Example 6 except that:

mixing of the lithium composite oxide having a larger average particle diameter (X2) and titanium oxide (TiO$_2$) and subsequent calcination were not performed; and mixing of the lithium composite oxide having a smaller average particle diameter (Y2) and TiO$_2$ and subsequent calcination were not performed, in the synthesis of the positive electrode active material.

Comparative Example 4

A non-aqueous electrolyte secondary battery was produced in the same manner as in Example 5 except that: mixing of the lithium composite oxide having a larger average particle diameter (X2) and titanium oxide (TiO$_2$) and subsequent calcination were not performed; and mixing of the lithium composite oxide having a smaller average particle diameter (Y2) and TiO$_2$ and subsequent calcination were not performed, in the synthesis of the positive electrode active material.

Comparative Example 5

A non-aqueous electrolyte secondary battery was produced in the same manner as in Example 6 except that: the lithium hydroxide, the nickel-cobalt-manganese composite oxide having a smaller average particle diameter (Y1), and titanium oxide (TiO$_2$) were mixed so that a molar ratio between Li, the total amount of Ni, Co, and Mn, and Ti in TiO$_2$ was 1.08:1:0.015; mixing of the lithium composite oxide having a larger average particle diameter (X2) and titanium oxide (TiO$_2$) and subsequent calcination were not performed; and mixing of the lithium composite oxide having a smaller average particle diameter (Y2) and TiO$_2$ and subsequent calcination were not performed, in the synthesis of the positive electrode active material.

Comparative Example 6

A non-aqueous electrolyte secondary battery was produced in the same manner as in Example 1 except that molybdenum oxide (MoO$_3$) was used instead of TiO$_2$ in the synthesis of the positive electrode active material.

Comparative Example 7

A non-aqueous electrolyte secondary battery was produced in the same manner as in Example 2 except that MoO$_3$ was used instead of TiO$_2$ in the synthesis of the positive electrode active material.

Comparative Example 8

A non-aqueous electrolyte secondary battery was produced in the same manner as in Example 3 except that MoO$_3$ was used instead of TiO$_2$ in the synthesis of the positive electrode active material.

Comparative Example 9

A non-aqueous electrolyte secondary battery was produced in the same manner as in Example 4 except that MoO$_3$ was used instead of TiO$_2$ in the synthesis of the positive electrode active material.

Comparative Example 10

A non-aqueous electrolyte secondary battery was produced in the same manner as in Example 5 except that MoO$_3$ was used instead of TiO$_2$ in the synthesis of the positive electrode active material.

Comparative Example 11

A non-aqueous electrolyte secondary battery was produced in the same manner as in Example 6 except that MoO$_3$ was used instead of TiO$_2$ in the synthesis of the positive electrode active material.

Comparative Example 12

A non-aqueous electrolyte secondary battery was produced in the same manner as in Example 1 except that tantalum oxide (Ta$_2$O$_5$) was used instead of TiO$_2$ in the synthesis of the positive electrode active material.

Comparative Example 13

A non-aqueous electrolyte secondary battery was produced in the same manner as in Example 2 except that Ta$_2$O$_5$ was used instead of TiO$_2$ in the synthesis of the positive electrode active material.

Comparative Example 14

A non-aqueous electrolyte secondary battery was produced in the same manner as in Example 3 except that Ta$_2$O$_5$ was used instead of TiO$_2$ in the synthesis of the positive electrode active material.

Comparative Example 15

A non-aqueous electrolyte secondary battery was produced in the same manner as in Example 4 except that Ta$_2$O$_5$ was used instead of TiO$_2$ in the synthesis of the positive electrode active material.

Comparative Example 16

A non-aqueous electrolyte secondary battery was produced in the same manner as in Example 5 except that Ta$_2$O$_5$ was used instead of TiO$_2$ in the synthesis of the positive electrode active material.

Comparative Example 17

A non-aqueous electrolyte secondary battery was produced in the same manner as in Example 6 except that Ta$_2$O$_5$ was used instead of TiO$_2$ in the synthesis of the positive electrode active material.

A cycle test was performed on each of the batteries of Examples and Comparative Examples to evaluate a resistance increase rate and a capacity maintenance rate. The evaluation results are shown in Tables 1A, 1B, and 2. Tables 1A, 1B, and 2 also show: the metal elements added to the nickel-cobalt-manganese composite oxide (Me); the ratios (A2/A1) of a mole fraction of Me on the surfaces of the second particles (A2) to a mole fraction of Me on the surfaces of the first particles (A1); and which of the first particle and second particle has a higher ratio of a mole fraction of Ti present on the particle surface to a mole fraction of Ti in an entirety of the particles (amount of LiMeO/amount of Me in an entirety of the particles).

[Evaluation of Resistance Increase Rate after Cycle Test]

Each of the batteries of Examples and Comparative Examples was charged at a constant current of 0.5 It to the half of an initial capacity under a temperature environment of 25° C., and then the charge was stopped to be left for 15 minutes. Thereafter, the battery was charged at a constant current of 0.1 It for 10 seconds to measure a voltage at this time. After discharging the capacity charged for 10 seconds, the battery was charged at a changed current value for 10 seconds to measure a voltage at this time, and then the capacity charged for 10 seconds was discharged. The charge and discharge and the voltage measurements were repeated with currents value from 0.1 It to 2 It. A resistance value was determined by a relation between the measured voltage values and current values to be a resistance value before the cycle test.

The following cycle test was performed, and a resistance value after 150 cycles was determined with the above method to calculate a resistance increase rate with the following formula. The resistance increase rates shown in Tables 1A, 1B, and 2 are relative values relative to a resistance increase rate of the battery of Example 1 being 100.

Resistance Increase Rate (%)=(Resistance Value after 150 Cycles/Resistance Value before Cycle Test)×100

<Cycle Test>

A test cell was charged at a constant current of 0.5 It until a battery voltage reached 4.2 V under a temperature environment of 60° C., and charged at a constant voltage of 4.2 V until a current value reached 1/50 It. Then, the test cell was discharged at a constant current of 0.5 It until the battery voltage reached 2.5 V. This charge-discharge cycle was repeated 150 times.

[Evaluation of Capacity Maintenance Rate after Cycle Test]

On each of the batteries of Examples and Comparative Examples, a discharge capacity at the 1st cycle and discharge capacity at the 150th cycle in the cycle test were determined, and the capacity maintenance rate was calculated with the following formula.

Capacity Maintenance Rate (%)=(Discharge Capacity at 150th Cycle/Discharge Capacity at 1st Cycle)×100

TABLE 1A

| | Metal Element Me Added | Me Added into X1 and Y1 (Molar Ratio) | | Me Added into X2 and Y2 (Molar Ratio) | | A2/A1 | Amount of LiMeO/ Amount of Me in Entirety of Particles | Amount of Me Solid-Solved (First Particle/ Second Particle) | Increase Rate in Resistance (-) | Capacity Maintenance Rate (%) |
|---|---|---|---|---|---|---|---|---|---|---|
| | | X1 | Y1 | X2 | Y2 | | | | | |
| Comparative Example 1 | — | None | None | None | None | — | — | — | 240 | 40 |
| Comparative Example 2 | Ti | None | None | 0.02 | 0.02 | 1.00 | — | — | 188 | 55 |
| Comparative Example 3 | Ti | 0.01 | 0.01 | None | None | — | — | 1.00 | 225 | 45 |
| Comparative Example 4 | Ti | None | 0.01 | None | None | — | — | — | 230 | 42 |
| Comparative Example 5 | Ti | 0.01 | 0.015 | None | None | — | — | 0.65 | 220 | 48 |
| Comparative Example 6 | Mo | None | None | 0.020 | 0.025 | 1.16 | — | — | 201 | 49 |
| Comparative Example 7 | Mo | None | None | 0.020 | 0.030 | 1.23 | — | — | 194 | 51 |
| Comparative Example 8 | Mo | None | None | 0.020 | 0.025 | 1.20 | First Particle < Second Particle | — | 200 | 50 |
| Comparative Example 9 | Mo | 0.01 | None | 0.020 | 0.025 | 1.14 | — | — | 235 | 41 |
| Comparative Example 10 | Mo | None | 0.01 | 0.020 | 0.025 | 1.18 | — | — | 231 | 44 |
| Comparative Example 11 | Mo | 0.01 | 0.01 | 0.020 | 0.025 | 1.17 | — | 1.00 | 227 | 47 |

TABLE 1B

| | Metal Element Me Added | Me Added into X1 and Y1 (Molar Ratio) | | Me Added into X2 and Y2 (Molar Ratio) | | A2/A1 | Amount of LiMeO/ Amount of Me in Entirety of Particles | Amount of Me Solid-Solved (First Particle/ Second Particle) | Increase Rate in Resistance (-) | Capacity Maintenance Rate (%) |
|---|---|---|---|---|---|---|---|---|---|---|
| | | X1 | Y1 | X2 | Y2 | | | | | |
| Comparative Example 12 | Ta | None | None | 0.020 | 0.025 | 1.17 | — | — | 200 | 44 |

TABLE 1B-continued

|  | Metal Element Me Added | Me Added into X1 and Y1 (Molar Ratio) | | Me Added into X2 and Y2 (Molar Ratio) | | A2/A1 | Amount of LiMeO/ Amount of Me in Entirety of Particles | Amount of Me Solid-Solved (First Particle/ Second Particle) | Increase Rate in Resistance (-) | Capacity Maintenance Rate (%) |
| --- | --- | --- | --- | --- | --- | --- | --- | --- | --- | --- |
|  |  | X1 | Y1 | X2 | Y2 |  |  |  |  |  |
| Comparative Example 13 | Ta | None | None | 0.020 | 0.030 | 1.24 | — | — | 188 | 50 |
| Comparative Example 14 | Ta | None | None | 0.020 | 0.025 | 1.20 | First Particle < Second Particle | — | 192 | 46 |
| Comparative Example 15 | Ta | 0.01 | None | 0.020 | 0.025 | 1.15 | — | — | 225 | 49 |
| Comparative Example 16 | Ta | None | 0.01 | 0.020 | 0.025 | 1.19 | — | — | 227 | 47 |
| Comparative Example 17 | Ta | 0.01 | 0.01 | 0.020 | 0.025 | 1.17 | — | 1.00 | 222 | 5.2 |

TABLE 2

|  | Metal Element Me Added | Me Added into X1 and Y1 (Molar Ratio) | | Me Added into X2 and Y2 (Molar Ratio) | | A2/A1 | Amount of LiMeO/ Amount of Me in Entirety of Particles | Amount of Me Solid-Solved (First Particle/ Second Particle) | Increase Rate in Resistance (-) | Capacity Maintenance Rate (%) |
| --- | --- | --- | --- | --- | --- | --- | --- | --- | --- | --- |
|  | Me Added | X1 | Y1 | X2 | Y2 |  |  |  |  |  |
| Example 1 | Ti | None | None | 0.020 | 0.025 | 1.17 | — | — | 100 | 76 |
| Example 2 | Ti | None | None | 0.020 | 0.030 | 1.29 | — | — | 90 | 84 |
| Example 3 | Ti | None | None | 0.020 | 0.025 | 1.20 | First Particle < Second Particle | — | 94 | 82 |
| Example 4 | Ti | 0.01 | None | 0.020 | 0.025 | 1.16 | — | — | 98 | 78 |
| Example 5 | Ti | None | 0.01 | 0.020 | 0.025 | 1.18 | — | — | 97 | 78 |
| Example 6 | Ti | 0.01 | 0.01 | 0.020 | 0.025 | 1.16 | — | 1.00 | 96 | 79 |

As shown in Tables 1A, 1B, and 2, any of the batteries of Examples has a significantly lower resistance increase rates and a significantly higher capacity maintenance rate than the batteries of Comparative Examples. In other words, it is found that the increase in resistance and lowering in capacity associated with charging and discharging are highly inhibited on the batteries of Examples. When the A2/A1 was 1.20 or more (Examples 2 and 3) and when the first particle had a lower ratio of the amount of LiMeO/amount of Me in an entirety of the particle than the second particle (Example 3), a particularly excellent effect was obtained.

When the A2/A1 was 1.00 or less and when an element other than Ti (Mo or Ta) was added to the nickel-cobalt-manganese composite oxide even with the A2/A1 of more than 1.00, such as the batteries of Comparative Examples, the resistance was increased largely and the capacity was lowered largely associated with charging and discharging. Even when Ti was added, upon formation of a solid solution inside the primary particles rather than being present on the surface, the resistance was increased largely and the capacity was lowered largely associated with charging and discharging.

REFERENCE SIGNS LIST

10 Secondary battery
11 Positive electrode
12 Negative electrode
13 Separator
14 Electrode assembly
16 Exterior housing can
17 Sealing assembly
18, 19 Insulating plate
20 Positive electrode lead
21 Negative electrode lead
22 Grooved part
23 Internal terminal plate
24 Lower vent member
25 Insulating member
26 Upper vent member
27 Cap
28 Gasket

The invention claimed is:
1. A positive electrode active material for a non-aqueous electrolyte secondary battery, the positive electrode active material including:

a lithium-transition metal composite oxide containing 80 mol % or more of Ni based on a total number of moles of metal elements excluding Li; and Ti being present on at least a particle surface of the composite oxide, wherein when particles having a particle diameter on a volumetric basis larger than a 70% particle diameter (D70) are defined as first particles, and particles having a particle diameter on a volumetric basis smaller than a 30% particle diameter (D30) are defined as second particles, a mole fraction of Ti based on a total number of moles of metal elements excluding Li on surfaces of the second particles is larger than a mole fraction of Ti based on a total number of moles of metal elements excluding Li on surfaces of the first particles, wherein the lithium-transition metal composite oxide is a composite oxide represented by the general formula $Li_aNi_bCo_cMn_dTi_eO_f$, wherein $0.8 \leq a \leq 1.2$, $b \geq 0.82$, $c \leq 0.12$, $0.03 \leq d \leq 0.12$, $0.01 \leq e \leq 0.05$, and $1 \leq f \leq 2$, and may further contain at least one metal element selected from Al, Zr, B, Mg, Fe, Cu, Zn, Sn, Na, K, Ba, Sr, Ca, W, Mo, Nb, and Si.

2. The positive electrode active material for a non-aqueous electrolyte secondary battery according to claim 1, wherein the Ti is present in a state of lithium titanate on the particle surface of the lithium-transition metal composite oxide.

3. The positive electrode active material for a non-aqueous electrolyte secondary battery according to claim 1, wherein a ratio (A2/A1) of the mole fraction of Ti on the surfaces of the second particles (A2) to the mole fraction of Ti on the surfaces of the first particles (A1), is 1.20 or more.

4. The positive electrode active material for a non-aqueous electrolyte secondary battery according to claim 1, wherein the second particles have a larger ratio than the first particles, of the mole fraction of Ti present on the particle surface to a mole fraction of Ti in an entirety of particles.

5. A non-aqueous electrolyte secondary battery, comprising:
a positive electrode including the positive electrode active material according to claim 1;
a negative electrode; and
a non-aqueous electrolyte.

* * * * *